United States Patent [19]

Koharagi et al.

[11] Patent Number: 5,015,905
[45] Date of Patent: May 14, 1991

[54] DC DYNAMOELECTRIC MACHINE WITH INTERPOLES HAVING MAGNETIC FLUX BYPASSING MEMBERS

[75] Inventors: Haruo Koharagi, Jyuou; Kazuo Tahara; Mitsuhiro Nitobe, both of Hitachi; Nobutaka Suzuki, Tahagi, all of Japan

[73] Assignees: Hitachi, Ltd., Tokyo; Hitachi Setsubi Engineering Co., Ltd., Ibaraki, both of Japan

[21] Appl. No.: 353,473

[22] Filed: May 17, 1989

[30] Foreign Application Priority Data

May 27, 1988 [JP] Japan ................. 63-128446
Jul. 13, 1988 [JP] Japan ................. 63-172741

[51] Int. Cl.$^5$ ............................................. H02K 1/10
[52] U.S. Cl. ..................................... 310/186; 310/191; 310/224
[58] Field of Search ............... 310/186, 190, 191, 220, 310/223, 224, 226

[56] References Cited

U.S. PATENT DOCUMENTS

| | | | |
|---|---|---|---|
| 795,481 | 7/1905 | Chitty | 310/226 |
| 1,680,731 | 8/1928 | Deale | 310/186 |
| 2,409,503 | 10/1946 | Linville | 310/224 |
| 3,576,456 | 4/1971 | DeWolf | 310/186 |
| 4,423,359 | 12/1983 | Hashimoto | 310/118 |
| 4,588,752 | 4/1986 | Breitbach | 310/90.5 |
| 4,616,150 | 10/1986 | Concannon | 310/186 |

FOREIGN PATENT DOCUMENTS 62-71463 of 1987 Japan.
440881 1/1936 United Kingdom ............. 310/190

Primary Examiner—William H. Beha, Jr.
Assistant Examiner—C. LaBalle
Attorney, Agent, or Firm—Antonelli, Terry, Stout & Kraus

[57] ABSTRACT

A DC dynamoelectric machine with interpoles between field poles operable in sparkles even under heavy operating conditions comprising a solid soft iron magnetic flux bypassing members, each disposed between respective field poles and interpoles at their ends near its armature with an air gap between the field pole for controlling interpole magnetic flux, the solid soft iron magnetic flux bypassing member suppresses sudden change of magnetic flux flowing therethough by permitting flow of eddy current therethrough and maintains the interpole magnetic flux at a desired amount even during a sudden change of load current.

9 Claims, 2 Drawing Sheets

1

DC DYNAMOELECTRIC MACHINE WITH INTERPOLES HAVING MAGNETIC FLUX BYPASSING MEMBERS

The present invention relates to a DC dynamoelectric machine which operates sparkless even under, heavy operating conditions. In particular, present invention relates to a DC motor suitable for driving a rolling mill, such as a cold rolling mill, which requires four quadrant operations such as a wide range of rotating speed, frequent acceleration, deceleration and normal, and reverse rotation, and repetitive heavy loading for producing a rolled sheet having a desired thickness.

BACKGROUND OF THE INVENTION

It is well known that a sparkless operating region or band of a DC dynamoelectric machine incorporating interpoles therein shifts toward an excitation reducing side in accordance with its rotating speed.

Japanese Patent Application Laid-Open No. 62-71463 (1987) discloses a DC dynamoelectric machine incorporating, interpoles therein and having itself provisions therein for suppressing the shift of the sparkless operating region, in that, an adjusting magnetic member is disposed between the respective main poles and interpoles, optionally through air gap therebetween, so as to control leakage of interpole magnetic flux in such a manner that the leakage is restricted during a low speed operation and is increased during a high speed operation. However such DC dynamoelectric machine is found out to be insufficient to suppress the shift of the sparkless operation region and to maintain the, sparkless operation during transient operations, i.e., during a sudden change of load current during and over load operations up to 200% of rated load current which are frequently encountered during the driving of the cold rolling mill.

SUMMARY OF THE INVENTION

One object of the present invention is to provide a DC dynamoelectric machine incorporating interpoles therein which suppresses the shift of the sparkless operation region and maintain the sparkless operation even in transient and over load operations.

Another object of the present invention is to provide a DC dynamoelectric machine incorporating interpoles therein which maintains a linear relationship between its load current and interpole magnetic flux even under heavy four quadrant operating conditions so that sparkless operation thereof is achieved.

The DC dynamoelectric machine of the present invention incorporating interpoles disposed between main poles or field poles comprises magnetic flux bypassing members, each disposed between a field pole and an interpole at their ends near the armature of the DC dynamoelectric machine and including an element of magnetic material which permits eddy current flow therein and changes its magnetic reluctance during magnetic flux variation therein, in that, the transient operation period, to suppress a sudden change of leakage magnetic flux flowing through the magnetic flux bypassing member. The magnetic flux bypassing member is supported by the interpole and magnetically coupled to the field pole through an air gap of between 2 mm and 15 mm for adjusting the magnetic reluctance of the magnetic flux bypassing member as a whole to control leakage of magnetic flux therethrough, such that the magnetic flux bypassing member disposed between the field pole and the interpole of the same polarity bypasses a part of magnetic flux induced by the field pole into the interpole to increase an interpole magnetic flux for generating a desired commutation electromotive force when the DC dynamoelectric machine is operating under a predetermined load current with a full excitation, and bypasses a part of magnetic flux induced by the interpole into the field pole to decrease an interpole magnetic flux for generating a desired commutation electromotive force when the DC dynamoelectric machine is operating under a predetermined load current with a reduced excitation.

Without such an element of magnetic material in the magnetic flux bypassing member, the interpole magnetic flux during a sudden increase in load current unduly leaks through the magnetic flux bypassing member partly because of a sudden increase in the counter magnetomotive force caused by an armature reaction which is the maximum under the interpole so that an interpole magnetic flux necessary for the desired commutation is unobtainable. Further, the interpole magnetic flux during a sudden decrease of the load current insufficiently leaks through the magnetic flux bypassing member partly because of a sudden decrease in the counter magnetomotive force caused by the armature reaction which is the maximum under the interpole so that an interpole magnetic flux necessary for the desired commutation is exceeded. In other words, a linear relationship between the load current, which flows through the armature and the interpole winding, and the interpole magnetic flux is lost during the transient operation.

Moreover without such a proper length of the air gap in the magnetic flux bypassing circuit between the field pole and the interpole, the linear relationship between the load current and the interpole magnetic flux is also lost during the overload current operations.

DESCRIPTION OF THE PREFERRED EMBODIMENT

Figure 1:
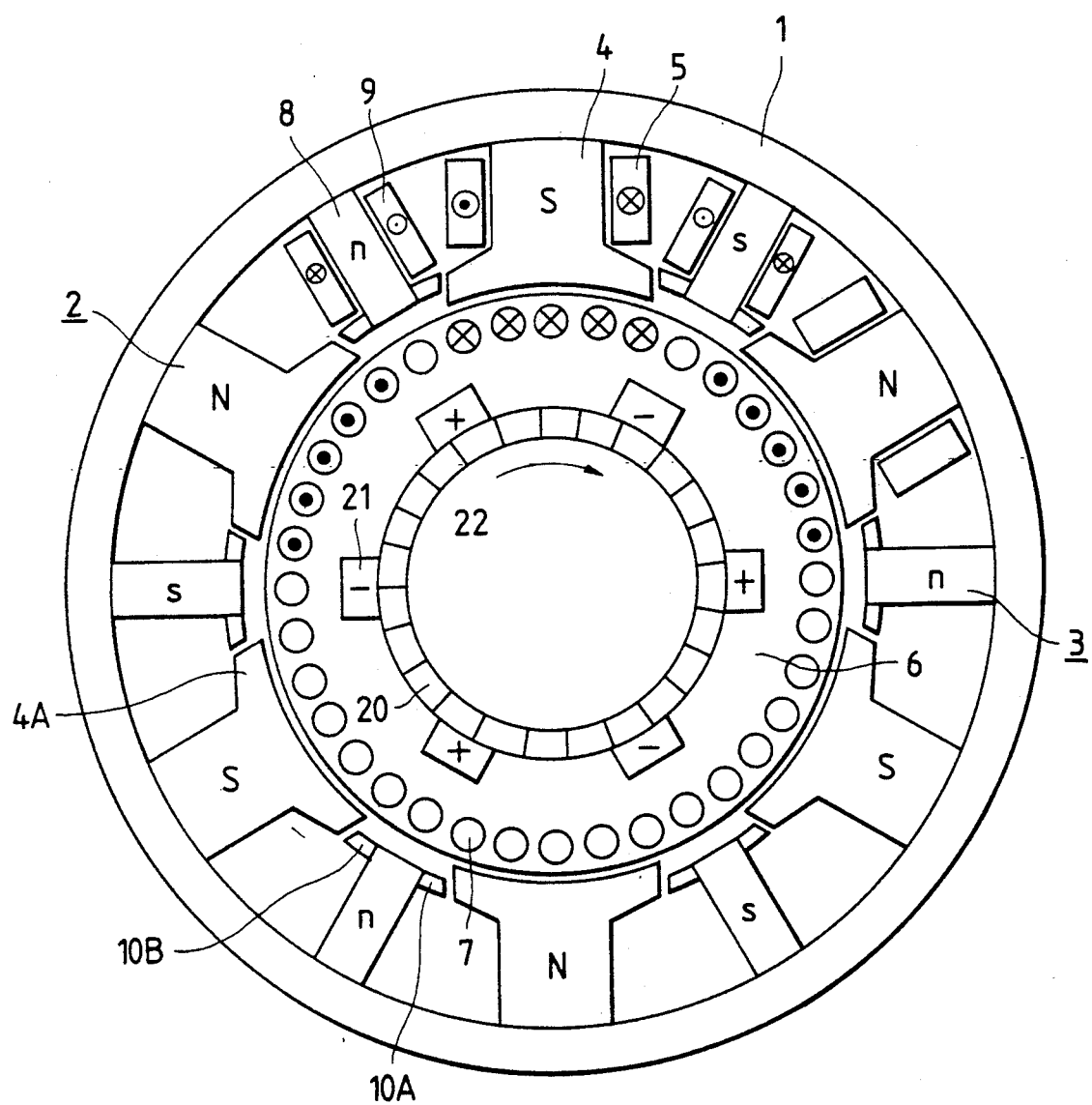
FIG. 1 is a schematic partly sectional view of one embodiment according to the present invention.

The one embodiment of the DC dynamoelectric machine according to the present invention shown in FIG. 1 includes eight main poles or field poles 2 which are fastened to the inside of an annular yoke 1. Between the respective field poles 2, there are provided interpoles 3 which also fastened to the inside of the annular yoke 1. Within the stator of the DC dynamoelectric machine including the field poles 2, the interpoles 3 and the yoke 1, an atmature 6 is rotatably disposed. Each field pole 2 is formed from a field pole piece 4 fastened to the yoke 1 and a field winding 5 surrounding the field pole piece 4 and plays a role to supply a main magnetic flux to armature windings 7 of the armature 6. Each interpole 3 is fromed from an interpole piece 8 fastened to the yoke 1 and an interpole winding 9 surrounding the interpole piece 8 and plays a role to supply an interpole magnetic flux for inducing a commutation electromotive force during commutation when the current flowing through the armature winding 7 reverses. Bypassing cores 10 A formed of a solid soft iron, each is disposed between the field pole piece 4 and the interpole piece 8 of the same polarity at their ends near the armature 6 and is supported by the interpole piece 8 with an air gap of 2 mm–15 mm between the pole tip 4 A of the field pole piece 4. Bypassing cores 10 B also formed of a solid soft iron, each is disposed between the field pole piece 4 and the interpole piece 8 of the different polarity at their ends near the armature 6 and is supported by the interpole piece 8 with an air gap of 2 mm–15 mm between the pole tip 4 A of the field pole piece 4. The armature 6 including the armature winding 7 and a commutator 20 are carried by a rotatable shaft 22. Brush assembly 21 slidably contacts to the commutator 20 and is carried by the stator (not shown).

In FIG. 1, "N" and "n" stand for north pole and "S" and "s" stand for south pole; the arrow indicates the direction of rotation of the rotor; the dots on the conductors indicate currents toward readers and the crosses on the conductors indicate currents away from readers; and the signs of plus and minus on the brush assembly indicate polarity of the brushes.

Figure 2:
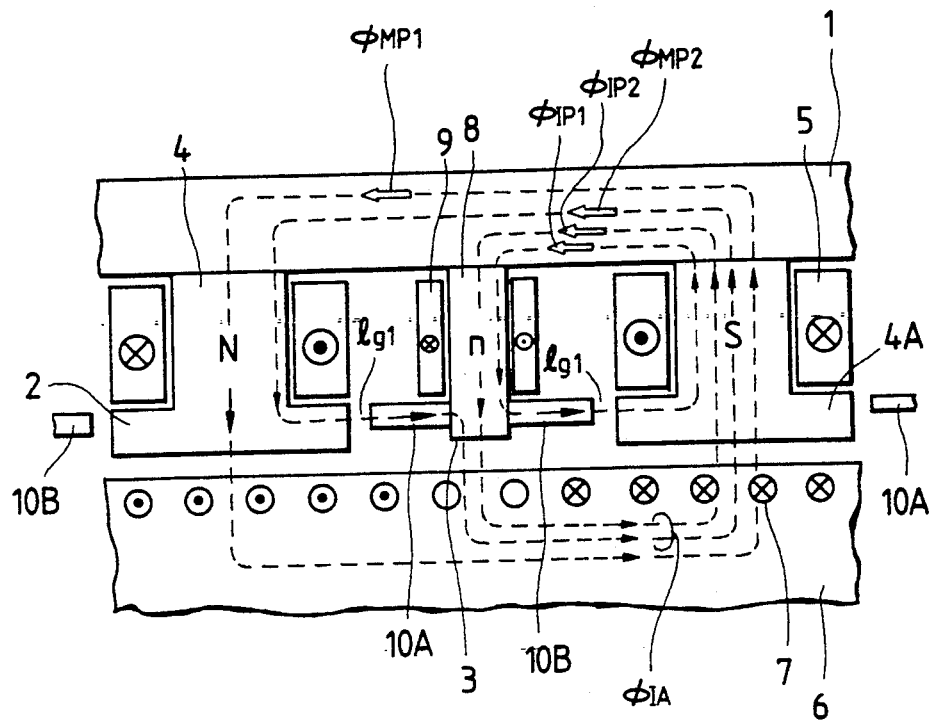
FIG. 2 is a developed partial view of FIG. 1 and illustrates flows of magnetic flux therein during a full excitation operation.
Figure 3:
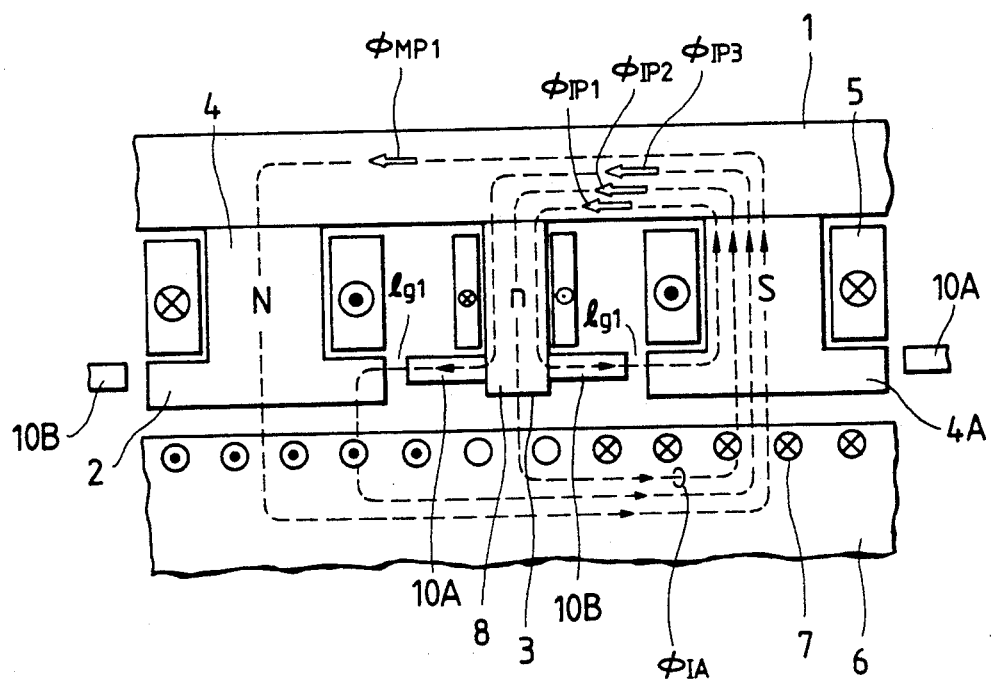
FIG. 3 is the same developed partial view of FIG. 2 and illustrates flows of magnetic flux therein during a reduced excitation operation.

FIGS. 2 and 3 illustrate flows of magnetic flux induced by the field poles 2 and the interpoles 3 in the magnetic circuits formed within the DC dynamoelectric machine respectively during a low speed operation with a full excitation and during a high speed operation with a reduced excitation.

In FIG. 2, since the field poles 2 are in a full excitation, and the magnetomotive force $AT_f$ caused by the field poles 2 is set more than that $AT_{IP}$ caused by the interpoles 3 upto over load current regions, the magnetic fluxes $\phi_{MP1}$ and $\phi_{MP2}$ induced thereby flow respectively, through the field pole 2 of "S" polarity, yoke 1, the field pole 2 of "N" polarity, an air gap between the field pole 2 of "N" polarity and the armature 6, the armature 6, an air gap between the armature 6 and the field pole 2 of "S" polarity and to the same field pole 2 of "S" polarity, and through the field pole 2 of "S" polarity, yoke 1, the field pole 2 of "N" polarity, the pole tip 4 A, an air gap $1_{gl}$, the solid soft iron core 10 A, the interpole 3 of "n" polarity, an air gap between the interpole 3 of "n" polarity and the armature 6, the armature 6, an air gap between the armature 6 and the field pole 2 of "S" polarity and to the same field pole 2 of "S" polarity. The magnetic fluxes $\phi_{IP1}$ and $\phi_{IP2}$ induced by the interpole 3 flow respectively, through the field pole 2 of "S" polarity, the yoke 1, the interpole 3 of "n" polarity, the solid soft iron core 10 B, an air gap $1_{gl}$, the pole tip 4 A and to the same field pole 2 of "S" polarity, and through the field pole 2 of "S" polarity, the yoke 1, the interpole 3 of "n" polarity, an air gap between the interpole 3 of "n" polarity and the armature 6, the armature 6, an air gap between the armature 6 and the field pole 2 of "S" polarity, and to the same field pole 2 of "S" polarity. Since the DC dynamoelectric machine is in a full excitation, the field pole pieces 4 are substantially saturated, and the leakage interpole magnetic flux $\phi_{IP1}$ is limited, and further the leakage field pole magnetic flux $\phi_{MP2}$ supplements the interpole magnetic flux $\phi_{IP2}$. As a result, a sufficient commutation compensating magnetic flux $\phi_{IA}$, the sum of $\phi_{IP1}$ and $\phi_{MP2}$, and which induces the commutation electromotive force, is obtained enough to suppress the shift of the sparkless operation region and to maintain the sparkless operation.

During the transient operation of the DC dynamoelectric machine, i.e., sudden increase and decrease of its load current, the sudden change of leakage magnetic fluxes $\phi_{MP2}$ and $\phi_{IP1}$ is suppressed respectively by the solid soft iron cores 10 A and 10 B in which eddy current flows to suppress the change such that a necessary commutation compensating magnetic flux $\phi_{IA}$ is maintained.

Different from the condition as explained with reference to FIG. 2, in FIG. 3, since the field poles 2 are in a reduced excitation state and the magnetomotive force $AT_f$ caused by the field poles 2 is set to be less than that $AT_{IP}$ caused by the interpoles 3, a part of the interpole magnetic flux $\phi_{IP3}$ leaks through the solid soft iron core 10 A and the air gap $1_{gl}$ to the pole tip 4 A of the field pole 2 of "N" polarity, instead of receiving the leakage magnetic flux $\phi_{MP2}$ as explained in connection with FIG. 2. Further, since the DC dynamoelectric machine is in a reduced excitation state, the field pole pieces 4 are not saturated so that the leakage interpole magnetic flux $\phi_{IP1}$ is increased in comparison with that in FIG. 2, as a result, the commutation compensating magnetic flux $\phi_{IA}$, the same as $\phi_{IP2}$ is limited enough to suppress the shift of the sparkless operation region and to maintain the sparkless operation, or, in other words, to keep the linear relationship between the load current and the interpole magnetic flux which contributes to the generation of the commutation electromotive force, that is, the commutation compensating magnetic flux $\phi_{IA}$.

During the transient operation of the DC dynamoelectric machine, i.e., sudden increase and decrease of its load current, the sudden change of leakage magnetic fluxes $\phi_{IP3}$ and $\phi_{IP1}$ is suppressed respectively by the solid soft iron cores 10 A and 10 B such that the commutation compensating magnetic flux is controlled to a desired amount.

In the above embodiment, although the solid soft iron core is used for the element in the magnetic flux bypassing member, any magnetic materials which permit eddy current flow are used therefor.

Further, in the above embodiment although the air gap is included in the magnetic flux bypassing circuit, any other non-magnetic elements having a high magnetic reluctance such as stainless steel and an electric insulating material are replaceable therefor.

We claim:

1. A DC dynamoelectric machine comprising:
   a stator including an annular yoke;
   a plurality of field poles each fastened to an inside of said annular yoke and having a field pole piece and a field winding surrounding said field pole piece;
   a plurality of interpoles each disposed between said field poles, fastened to the inside of said annular yoke and having an interpole piece and an interpole winding surrounding said interpole piece;
   an armature and an commutator rotatably disposed within said stator;
   a brush assembly supported through said stator and slidably contacting said commutator; and
   a plurality of magnetic flux bypassing members, each disposed between said field pole pieces and said interpole pieces at respective ends thereof near said armature, wherein each of said magnetic flux bypassing members include an element of magnetic material which permits eddy current flow therein during magnetic flux variation so as to suppress a sudden change of leakage magnetic flux flowing through said plurality of magnetic flux bypassing members in at least one of a direction from said field pole pieces to said interpole pieces and a direction from said interpole pieces to said field pole pieces.

2. The DC dynamoelectric machine according to claim 1, wherein said plurality of magnetic flux bypassing members are supported by said plurality of interpole without an air gap pieces and magnetically coupled to said plurality of field pole pieces through an air gap having a predetermined length.

3. The DC dynamoelectric machine according to claim 1, wherein said element of magnetic material is a solid soft iron core.

4. A DC dynamoelectric machine comprising:
a stator including an annular yoke;
a plurality of field poles each fastened to an inside of said annular yoke and having a field pole piece and a field winding surrounding said field pole piece;
a plurality of interpoles each disposed between said field poles, fastened to the inside of said annular yoke and having an interpole piece and an interpole winding surrounding said interpole piece;
an armature and a commutator rotatably disposed within said stator;
a brush assembly supported through said stator and slidably contacting said commutator; and
a plurality of magnetic flux bypassing members, each disposed between said field pole pieces and said interpole pieces at respective ends thereof near said armature, wherein each of said magnetic flux bypassing members include an element of magnetic material which permits eddy current flow therein during magnetic flux variation so as to suppress a sudden change of leakage magnetic flux flowing through said plurality of magnetic flux bypassing members;
wherein said plurality of magnetic flux bypassing members are supported by said plurality of interpole pieces and magnetically coupled to said plurality of field pole pieces through an air gap having a predetermined length, and the length of said air gap is between 2 mm and 15 mm.

5. The DC dynamoelectric machine according to claim 1, wherein said plurality of magnetic flux bypassing members bypass a part of a magnetic flux induced by said plurality of field poles into said plurality of interpoles during a full excitation of said DC dynamoelectric machine under a predetermined load current to increase an interpole magnetic flux and bypass a part of a magnetic flux induced by said plurality of interpoles into said plurality of field poles during a reduced excitation of said DC dynamoelectric machine under a predetermined load current to decrease an interpole magnetic flux.

6. The DC dynamoelectric machine according to claim 1, wherein said plurality of magnetic flux bypassing members including an element of magnetic material therein enable a linear relationship between a load current, which flows through the armature and the plurality of interpole windings, and an interpole magnetic flux to be maintained during a transient operation of said DC dynamoelectric machine.

7. The DC dynamoelectric machine according to claim 2, wherein said air gap enables a linear relationship between a load current, which flows through the armature and the plurality of interpole windings, and an interpole magnetic flux to be maintained during an overload operation of said DC dynamoelectric machine.

8. A DC dynamoelectric machine comprising:
a stator including an annular yoke
a plurality of field poles each fastened to an inside of said annular yoke and having a field pole piece and a field winding surrounding said field pole piece;
a plurality of interpoles each disposed between said field poles, fastened to the inside of said annular yoke and having an interpole piece and an interpole winding surrounding said interpole piece;
an armature and a commutator rotatably disposed within said stator;
a brush assembly supported through said stator and slidably contacting said commutator; and
a plurality of magnetic flux bypassing members, each disposed between said field pole pieces and said interpole pieces at respective ends thereof near said armature, each of said magnetic flux bypassing members being made of magnetic material and electric current conductive material which bypasses magnetic flux and permits eddy current flow generated by leakage magnetic flux flowing through said plurality of magnetic flux bypassing members in at least one of a direction from said field pole pieces to said interpole pieces and a direction from said interpole pieces to said field pole pieces.

9. The DC dynamoelectric machine according to claim 8, wherein said plurality of magnetic flux bypassing members including an element of magnetic material therein enable a linear relationship between a load current, which flows through the armature and the plurality of interpole windings, and an interpole magnetic flux to be maintained during a transient operation of said DC dynamoelectric machine.

* * * * *